United States Patent [19]

Shend'ge et al.

[11] 4,408,730
[45] Oct. 11, 1983

[54] PORTABLE WIRE DISPENSER

[75] Inventors: Vasant J. Shend'ge, London; Geoffrey S. Thompson, Windlesham, both of England

[73] Assignee: Multicore Solders Limited, Hemel Hempstead, England

[21] Appl. No.: 352,205

[22] Filed: Feb. 25, 1982

[30] Foreign Application Priority Data

Mar. 25, 1981 [GB] United Kingdom ............... 8109291

[51] Int. Cl.³ ................. B65D 85/675; B65H 49/00; B65H 75/40
[52] U.S. Cl. ................. 242/96; 242/129.8; 242/137.1; 206/409; 226/128
[58] Field of Search ............ 242/96, 99, 84.8, 129.8, 242/137.1, 7.18, 1; 128/340; 132/91, 92 R, 92 A; 228/52, 53; 206/409; 226/128

[56] References Cited

U.S. PATENT DOCUMENTS

| | | | |
|---|---|---|---|
| 356,377 | 1/1887 | Roiseis | 242/137.1 X |
| 667,197 | 2/1901 | Dennis | 242/137.1 X |
| 866,547 | 9/1907 | Wilkinson | 242/96 X |
| 2,507,541 | 5/1950 | Patterson | 242/96 X |
| 3,613,958 | 10/1971 | Opp | 248/360 |

FOREIGN PATENT DOCUMENTS 443604 7/1912 France .......................... 242/137.1

Primary Examiner—Stuart S. Levy
Assistant Examiner—Lloyd D. Doigan
Attorney, Agent, or Firm—Finnegan, Henderson, Farabow, Garrett & Dunner

[57] ABSTRACT

A portable wire dispenser, suitable for use with solder wire of the type employed in making soldered joints in electrical equipment by a soft soldering operation, comprises a cylindrical body one end of which is closed and the other end of which is open and accommodates an outlet formed with a helical first passageway in communication with a second passageway which is substantially parallel to the longitudinal axis of the cylindrical body, the arrangement being such that a helical coil of wire can be contained in the cylindrical body and can be drawn therefrom by means of a free end of wire emerging from the second passageway in the outlet but is constrained from slipping back into the cylindrical body by the helical first passageway which meets the second passageway at approximately a right angle.

3 Claims, 3 Drawing Figures

PORTABLE WIRE DISPENSER

This invention relates to a portable wire dispenser and is concerned with a hand-holdable portable dispenser for a wire, particularly but not exclusively a soft solder wire such as that used in soldering electrical contacts.

The invention will be described by way of example with reference to the accompanying drawings, wherein.

Figure 1:
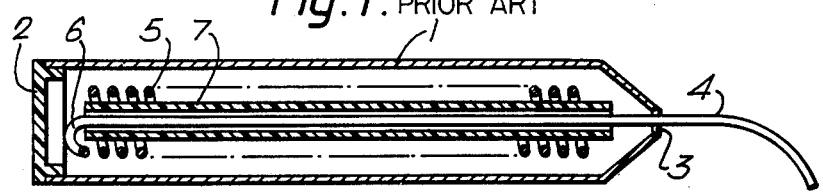
FIG. 1 is a view of a known type of solder wire dispenser.

A known type of solder wire dispenser, a cross-section of which is illustrated in FIG. 1 of the accompanying drawing, comprises a metal tube 1, one end of which is closed by means of a removable plastics cap 2. The other end of the tube is provided with a small aperture 3 through which solder wire 4 can be fed. The solder wire 4 is contained within the metal tube 1 in the form of a spiral coil 5 having an unwound free end 6 which passes longitudinally from the inner end of the coil 5 to the aperture 3 through a plastics tube 7 which supports the free end of the solder wire and is situated axially within the coil 5. The free end of the solder wire passes through the aperture 3 and when the wire is required for use, an appropriate length of the wire can be drawn from the dispenser tube and fed to the required joint site or on to the soldering iron being employed. Although the use of the plastics tube 7 to support the free end of the solder wire within the dispenser tube helps to prevent the free end of the solder wire 4 slipping back through the aperture 3 and into the dispenser tube 1, there are nevertheless two main disadvantages of this known type of dispenser. Firstly, the solder wire can kink or twist in the region where the free end of the solder wire enters the plastics support tube inside the dispenser, causing the solder wire to break or become jammed, and secondly, the passing of the free end of the solder wire 4 through the plastics support tube 7 and through the aperture 3 at the end of the dispenser tube, normally carried out by hand during the assembly of the solder wire dispenser, is a comparatively slow and difficult operation.

It is an object of the present invention to provide a portable wire dispenser which, whilst preventing the wire from slipping back into the dispenser and/or kinking or twisting within the dispenser, will also be easier to assemble than the known type of dispenser described above.

According to the present invention there is provided a hand-holdable portable dispenser for a wire, such as a soft solder wire for use in soldering electrical contacts, comprising a cylindrical body in which a helical coil of the wire can be accommodated, the body having one end closed and the other end open, and an outlet positioned in said open end of the body, the outlet having a helical first passageway for the wire in communication with a second passageway which is substantially parallel to the longitudinal axis of the body, the arrangement being such that wire from a helical coil of wire contained within the body of the dispenser can be drawn therefrom by means of a free end of wire emerging from said second passageway in the outlet but is constrained from slipping back into the body of the dispenser by said helical first passageway.

Figure 2:
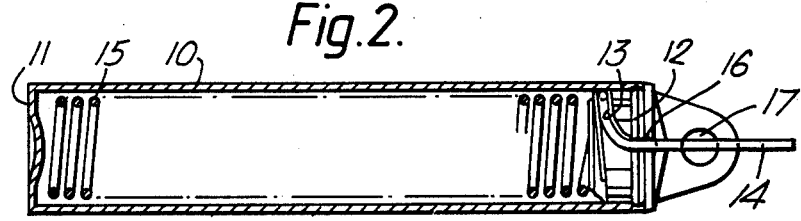
FIG. 2 is a longitudinal sectional view of the wire dispenser body and outlet member of the invention; and, FIG. 3 is an enlarged detailed view of the outlet member of the invention.

FIG. 2 of the accompanying drawing shows a longitudinal section of a preferred embodiment of the invention. Referring to FIG. 2, the wire dispenser comprises a cylindrical body 10 having integrally formed therewith a closed end 11. The other end of the body 10 is open and into this open end is force fitted an outlet 12 having a helical first passageway 13 for the free end 14 of a helical coil of soft solder wire 15 contained in the body 10.

Figure 3:
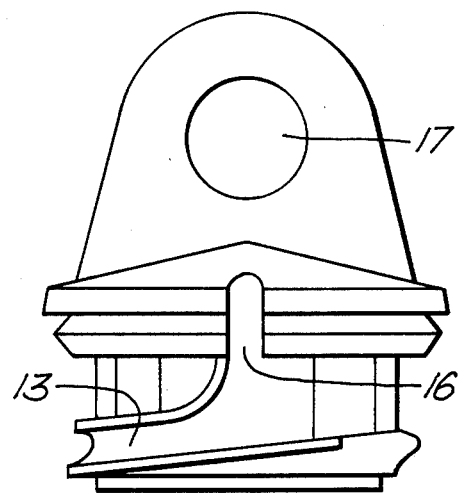

FIG. 3 in the accompanying drawing shows the outlet 12 on a larger scale. In FIG. 3 can be seen the generally cylindrical body of the outlet on the external surface of which is formed the helical passageway 13 which communicates with a second passageway 16 which is substantially parallel to the axis of the body 10. As can be seen from FIG. 2, the free end 14 of the helical coil of wire 15 passes along the helical passageway 13 of the outlet 12 and then turns through an angle of approximately 90° into the passageway 16 before emerging from the outlet of the dispenser.

The body 10 and outlet 12 may be moulded from a suitable synthetic thermoplastics plastic material, for example polypropylene. If desired, the outlet 12 may be formed with an external vertical flange having an aperture 17 by means of which the dispenser can be hung, for example on a hook or nail, either at the point-of-sale or at the work-bench without interfering with the path of the free end 14 of the solder wire.

In order to position a helical coil of solder wire 15 within the dispenser, the required wire is initially wound on a rotatable mandrel to form a suitably sized helical coil of the wire which is then cut off from the main solder wire supply. The helical coil can then have one end thereof fitted into the helical passageway 13 of an outlet 12 with, if necessary, the free end being straightened so as to pass through the outlet passageway 16. A dispenser body 10 can then be passed over the coil and the outlet 12 pressed into the open end of the body 10 to provide the required assembled dispenser.

The solder wire which may be packaged in the dispenser of the invention may be, for example, a flux-cored solder wire generally having a plurality of separate cores of a flux composition extending longitudinally therethrough, such as the rosin-cored solder wire marketed by us in the United Kingdom and elsewhere under the label Trade Mark "ERSIN" Multicore 5-Core Solder".

It will be appreciated that the construction of the dispenser of the present invention obviates the necessity of having a plastics support tube for the free end of the solder wire as in the previously known dispenser shown in FIG. 1 of the drawing, and hence the assembly of the solder wire within the dispenser can be a much easier operation compared with the previously known dispenser.

We claim:

1. A hand-held portable dispenser for a solder wire comprising, in combination, a hollow cylindrical body having a closed end and an open end, an outlet member having a generally cylindrical portion force fitted into said open end of said body, said cylindrical portion having a helical passageway formed on its external surface, said helical passageway having a substantially semicircular cross-section, a substantially linear passageway of substantially semicircular cross-section formed in said helical passageway and extending from the outer end of said helical passageway to the outlet of the dispenser, said linear passageway being substantially parallel to the longitudinal axis of the body, a helical coil of solder wire disposed in and occupying substantially the entire cross-sectional area of said cylindrical body and having one free end extending through said helical passageway and said linear passageway in said outlet member, said free end of said wire turning through an angle of approximately 90° as it passes from said helical passageway into said linear passageway, whereby said wire can be withdrawn from said outlet member through said helical and linear passageways without any substantial tendency to slip back into said cylindrical body.

2. A solder wire dispenser as claimed in claim 1, said cylindrical body and said closed end thereof being integrally formed.

3. A solder wire dispenser as claimed in claim 1, said outlet member being provided with an external vertical flange which is apertured.

* * * * *